(12) United States Patent
Thompson

(10) Patent No.: US 8,868,053 B2
(45) Date of Patent: Oct. 21, 2014

(54) COMMUNICATION DELIVERY FILTER FOR MOBILE DEVICE

(76) Inventor: Raphael A. Thompson, Sharpsburg, GA (US)

( * ) Notice: Subject to any disclaimer, the term of this patent is extended or adjusted under 35 U.S.C. 154(b) by 746 days.

(21) Appl. No.: 12/106,320

(22) Filed: Apr. 20, 2008

(65) Prior Publication Data

US 2009/0264116 A1 Oct. 22, 2009

Related U.S. Application Data

(60) Provisional application No. 60/913,263, filed on Apr. 20, 2007.

(51) Int. Cl.
*H04M 3/00* (2006.01)
*H04M 3/436* (2006.01)
*H04M 3/42* (2006.01)
*H04W 4/00* (2009.01)
*H04W 72/00* (2009.01)
*H04M 1/00* (2006.01)

(52) U.S. Cl.
CPC ...... *H04M 3/436* (2013.01); *H04M 2203/2072* (2013.01)
USPC ........ 455/418; 455/415; 455/466; 455/414.1; 455/450; 455/461; 379/352; 379/196; 379/201.01; 379/211.01

(58) Field of Classification Search
USPC ................................................. 455/411, 418
See application file for complete search history.

(56) References Cited

U.S. PATENT DOCUMENTS

| | | | |
|---|---|---|---|
| 4,893,329 A | 1/1990 | O'Brien | |
| 5,060,255 A | 10/1991 | Brown | |
| 5,128,981 A | 7/1992 | Tsukamota et al. | |
| 5,467,388 A | 11/1995 | Redd, Jr. et al. | |
| 6,041,108 A * | 3/2000 | Brewster et al. | 379/196 |
| 6,317,593 B1 | 11/2001 | Vossler | |
| 7,248,885 B2 | 7/2007 | Benco et al. | |
| 7,310,417 B1 | 12/2007 | Cook | |
| 2002/0141555 A1* | 10/2002 | Kim | 379/142.04 |
| 2005/0008135 A1* | 1/2005 | Bressler | 379/211.01 |
| 2005/0064854 A1* | 3/2005 | Jang | 455/415 |
| 2005/0201362 A1* | 9/2005 | Klein et al. | 370/352 |
| 2006/0057966 A1* | 3/2006 | Mise et al. | 455/67.13 |
| 2006/0072726 A1* | 4/2006 | Klein et al. | 379/201.01 |
| 2006/0246881 A1* | 11/2006 | Winkler et al. | 455/415 |
| 2008/0009299 A1* | 1/2008 | Ryu | 455/466 |
| 2008/0146200 A1* | 6/2008 | Martin et al. | 455/413 |

FOREIGN PATENT DOCUMENTS

WO WO9957880 A1 11/1999

* cited by examiner

*Primary Examiner* — Timothy Pham
(74) *Attorney, Agent, or Firm* — Smith Risley Tempel Santos LLC; Gregory Scott Smith

(57) ABSTRACT

Messages received by a mobile device can be processed in one of at least two modes. In the normal mode, the messages are handled in accordance with the normal settings of the mobile device. In the filtered mode, or "night-time" mode, incoming messages are examined to determine if they are to be filtered or if they are exempt from filtering. If a message is exempt from filtering, it is processed in accordance with the normal mode. However, if the message is to be filtered, the mobile device is prevented from providing normal message reception alert notifications. Messages can be identified as being exempt to being filtered by editing an address book or selecting entries from an address book. All messages not identified as exempt then get filtered.

7 Claims, 1 Drawing Sheet

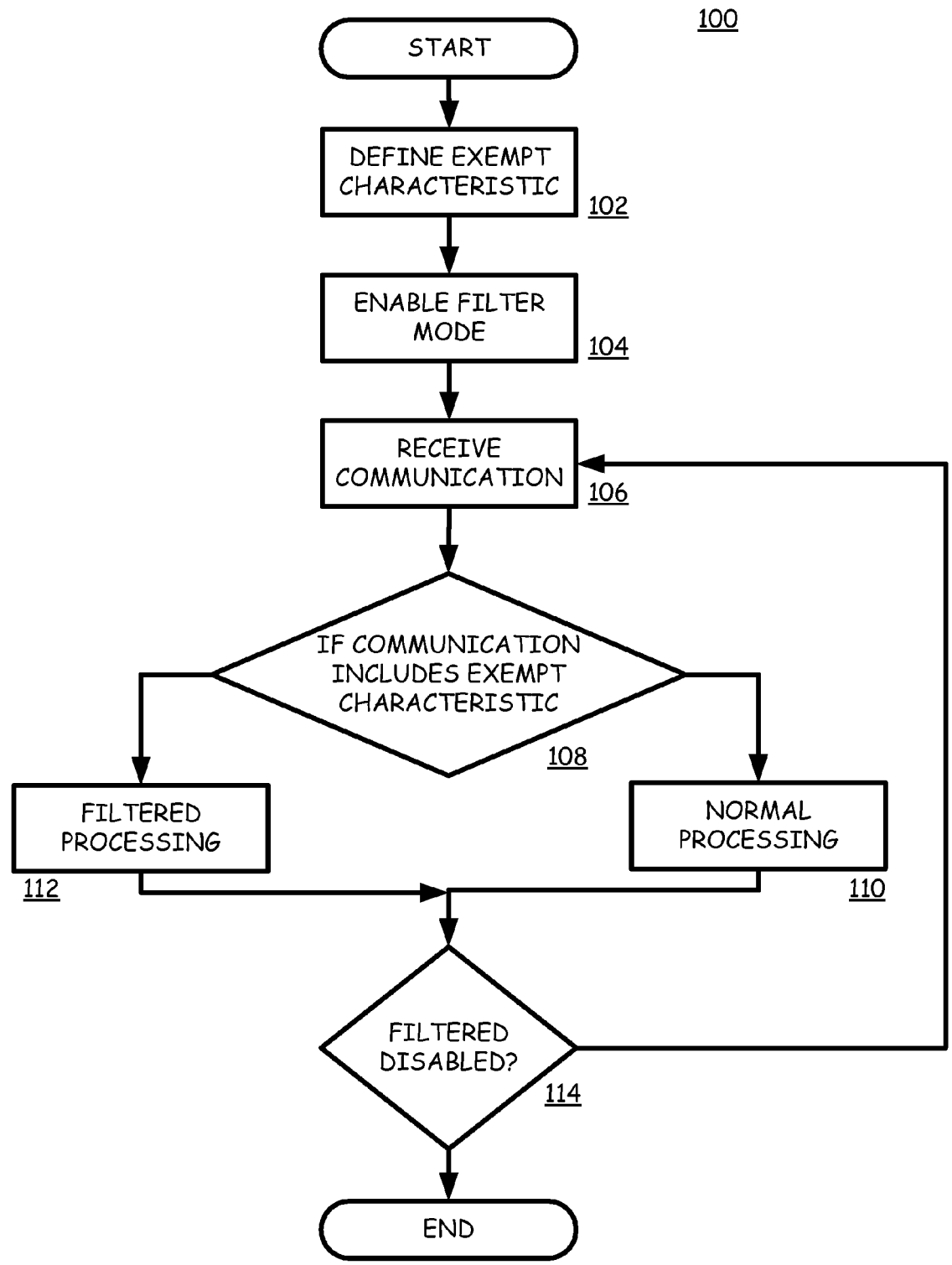

COMMUNICATION DELIVERY FILTER FOR MOBILE DEVICE

CROSS-REFERENCE TO RELATED APPLICATIONS

This is a non-provisional application being filed under 35 U.S.C. 111 and claiming the benefit of U.S. Provisional Application for Patent filed on Apr. 20, 2007 and assigned Ser. No. 60/913,263—which application is hereby incorporated by reference.

BACKGROUND OF THE INVENTION

Changes in the cellular industry have led to widespread, daily, and around-the-clock use of cell phones.

Initially, cellular phones were large, cumbersome, heavy, and expensive, with spotty reception and expensive airtime. By contrast, cell phones of today are small and light-in weight, with initial costs subsided by competing service providers. Today's cell phone plans have much better coverage and inexpensive airtime packages. New features have also dramatically fueled the huge increase in the number of phones and their constant around-the-clock use; with many phones never leaving their owner's side.

Most new phones have various new features, including text messaging, internal cameras providing the ability to send and receive pictures and video, web browsing, configurable ring tones, and MP3 players with music downloads. Cell phones with accurate date and time information (which automatically updates in new time zones) allow users to set the built-in alarm clocks to awaken to their choice of music the next morning.

Unfortunately, cell phones do not differ in day and night operation. Phones at night can receive text messages, pictures, wrong number calls, solicitation calls, or calls from inconsiderate friends who have lost track of time. Time zone changes can also make an otherwise normal 9:00 pm West Coast call awaken a user on the East Coast at midnight. Today, many cell phone users leave their cell phones on throughout the night, so as not to miss important calls. This unfortunately leaves the user open to being disturbed or awaken by calls or messages received during the nighttime that are not important.

Therefore, there has become a need for a method for a selectable Nighttime Mode that would stop notification of all incoming calls and messages, with the exception of those from a contact that have been predetermined as important (or Nighttime Mode exempt). The present invention process provides a unique, smart, and novel solution to the problem discussed.

BRIEF SUMMARY OF THE DISCLOSURE

The object of the invention is a method for a Nighttime Mode for cellular phones.

Nighttime Mode will allow users a way to use their phones during nighttime hours without receiving unwanted calls or messages (text, pictures, voicemail, or other incoming data). The default for the Nighttime Mode is to stop all incoming phone modes. The Nighttime Mode will be fully customizable. Customization will allow cell phone owners to choose pre-determined important contacts to be exempt from Nighttime Mode. During the Nighttime Mode, the phone will operate normally only for those selected Nighttime Mode exempt phone numbers. This will allow a cell phone to receive calls, text, or other incoming modes of communication only from numbers deemed to be important. For example, a user may wish to only receive a spouse's cell phone call during the Nighttime Mode. The user can select his/her number from the address book to be Nighttime Mode exempt. During the following night, when the Nighttime Mode turned on, the phone will only operate normally for the spouse's call; for all other callers, the phone remains silent. A cell phone user may select any number of contacts to be Nighttime Mode exempt.

Nighttime Mode can be turned on manually or automatically and will stay in effect until turned off either manually or automatically. A Nighttime Nap mode will provide the same function as the Nighttime mode but in short selectable durations.

One embodiment of the present invention includes a module or process that can operate within a mobile device and provide a filter of particular messages directed for delivery to a mobile device. Initially, the embodiment operates to identify at least one exempt message characteristic, such as a telephone number. The filtering mode can then be activated or enabled. When a communication is received, the communication is examined to determine if it contains the exempt message characteristic. If the message contains the exempt message characteristic, normal process is applied to the message. Otherwise, the message is filtered.

Another embodiment of the invention may include a user interface for entering telephone numbers as exempt message characteristics. Another embodiment may include the storage of a of telephone numbers and the process of identifying at least one exempt message characteristic includes selecting one or more telephone numbers from the plurality of telephone numbers. Thus, the selected telephone numbers being exempt message characteristics.

Embodiments of the invention may include an internal clock. In such embodiments, enabling the filter may include setting a start time at which the filter becomes active. Further, such an embodiment may also include the ability to set duration, such as be setting a time value or a stop time at which the filter becomes inactive.

Alternatively or in addition to, embodiments may include an alarm set-up interface and the filter can be enabled by receiving an alarm set on the alarm set-up interface, prompting a user to enable the filter, receiving a positive selection from the user, and enabling the filter mode in response to the positive selection. In addition, the filter can be disabled after an alarm occurs in accordance with the alarm set. Alternatively, the filter can be disabled a short delay after the alarm occurs in accordance with the alarm set; and disabling of the filter can be delayed if a snooze button or feature is actuated during the short delay.

As a specific example, if the message is a voice call then the action of filtering the message (i.e., if the exempt message characteristic is absent) may include instantly sending the message to voice mail. In addition, the action may include inhibiting the sounding of a message alert.

BRIEF DESCRIPTION OF THE SEVERAL VIEWS OF THE DRAWING

FIG. 1 is a flow diagram illustrating the steps involved in one embodiment of the present invention.

DETAILED DESCRIPTION OF THE DISCLOSURE

The Nighttime mode is a completely new process for cellular phones, which provides a unique, smart, and novel solution to the problem discussed earlier.

The selectable Nighttime mode will default to prohibit notification of all incoming calls and all types of messages, while the Nighttime mode is on. This mode will allow users to keep their phones on, but not be disturbed by incoming calls or messages. During Nighttime mode the cellular phone will remain silent and the screen will also remain dark when receiving any type of incoming calls and messages. Incoming callers will get the phones voicemail instantly as if the phone was actually off. Some phone models depending on the manufacture may have a selectable separate voice mail message to inform the caller the phone is in Nighttime mode and to leave a message. Other forms of messages (including text, picture, video) will be received by the phone but not announced during the Nighttime mode. Incoming message count during the Nighttime mode can be viewed on the screen but the phone will remain silent and dark (LCD screen will not be back lit). The Phone's screen will also have "Nighttime" or "Night" announced across the screen to remind the user the phone is in Nighttime mode. Once the Nighttime mode is turned off, the cell phone will revert to normal operation. Notification of any calls, voicemail, or messages received during the Nighttime mode will be announced by the phones normal means of notification to the user.

Although the Nighttime mode will default to prohibit notification of all incoming calls and all types of messages, the Nighttime mode will be fully customizable. Customization will allow cell phone owners to choose pre-determined important numbers to be exempt from the Nighttime mode 102. This will allow a cell phone to receive calls, text, or other incoming modes of communication 106 to be received only from numbers deemed to be important (Nighttime mode exempt) 108 and 110 while the Nighttime mode is on. Phone numbers may be pre-selected from the users address book to be Nighttime mode exempt 102. Some manufactures may select an alternate way of selecting Nighttime mode exempt phone numbers such as a separate menu where the numbers are entered. During the nighttime mode the phone will operate normally only for those selected Nighttime mode exempt phone numbers 110. For example, you may wish to only receive your spouse's cell phone call during the Nighttime mode. You select his/her number from the address book to be Nighttime mode exempt. During the following night with the Nighttime mode turned on, your phone will only operate normal for your spouse's call and for all other callers the phone remains silent 112. A cell phone user may select as many or as few numbers to be Nighttime mode exempt.

The Nighttime mode may be enabled in one of three ways 104. The first way discussed is by using the phone's internal clock. The second way is by the phone's internal alarm clock, and the last way discussed is by using the short Nighttime mode referred to as Nighttime Nap mode.

The first way to turn on the Nighttime Mode is with the help of the cell phones internal clock. The cell phone user selects a start and stop time for the Nighttime mode to be automatically turned on and off (using the phones internal clock). For example: A cell phone user goes to bed at 10:30 pm and get up at 6:30 am. The user then sets the Nighttime mode to turn on at 10:30 104 and turn off at 6:30 AM 114. From this same setup page the frequency of use of nighttime mode can also be set to: once, daily, mon-fri, or weekends. This setup page will vary from phone model to phone model depending on different phone manufactures and button placement, but the user will be able to select the start, and stop time and the frequency for the Nighttime mode.

Another way of starting the nighttime mode is when the phone's internal alarm is set. When the user sets the alarm (normally at bed time) to wake up the alarm set up page will prompt the user for nighttime mode to be started. If the user selects yes, then the Nighttime mode will be started instantly. Nighttime mode will stay in effect until 30 seconds after the alarm goes off. This delay will give a drowsy phone user time to use the alarm's snooze function without receiving notification of waiting messages. If the snooze is reselected, the Nighttime mode will continue until 30 seconds after the snooze alarm goes off, or the alarm is turned off. Once the alarm is turned off, the phone will provide notification of waiting messages via the phones normal notification process.

The last way to turn on the Nighttime mode is with a Nighttime Nap mode button. This Nighttime Nap mode functions the same way as the normal Nighttime mode with the exception of duration. Nighttime Nap mode will be selected in intervals of 15 minutes. The Nighttime Nap mode will be turned on instantly by selecting a Nighttime Nap button if available from the phone's manufacturer. If not, a normal menu will allow for quickly selecting a Nighttime Nap mode with intervals of 15 minutes. This feature will allow a user to have the benefits of Nighttime mode instantly, to take a nap without being disturbed by their phone. This feature can be selected for example by pushing the Nap mode button once for 15 min, twice for thirty minutes, three times for forty five minutes and so on. While the Nap mode is handy for an afternoon nap, the feature may be useful at other times when a cell phone's use should be limited to important calls only. For example, the nap mode may be useful at an important lunch meeting with clients when you may only want to be interrupted for important calls. Push the nap button four times, and instantly your phone turns on the Nighttime Nap mode, and you have an hour of undisturbed lunch, but you are still available for important calls. During the Nighttime Nap mode the phone's screen will also have "Nighttime Nap" or "Nap" announced across the screen to remind the user the phone is in Nighttime Nap mode. The phone will also display a countdown timer of how much time is left for the Nighttime Nap mode. The phone will remain in Nighttime nap mode until the selected amount of time runs out, or the nap mode is cancelled by the user. Then the phone will revert to normal operation.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method implemented within a mobile device for inhibiting the message notification of a particular message received at the mobile device, the method comprising the steps of:

receiving at least one exempt message characteristic, the at least one exempt message characteristic comprising information that identifies one or more telephone numbers as exempt message characteristics, the exempt message characteristics being received at the user interface of the mobile device wherein the mobile device includes the storage of a plurality of telephone numbers and the step of receiving information further comprises receiving a selection of one or more telephone numbers from the plurality of telephone numbers already stored within the mobile device;

enabling a message reception notification inhibitor in response to detecting certain user actuations at the user interface, the message reception notification inhibitor being implemented entirely within the mobile device, to be active such that message notifications for any messages received at the mobile device are by default inhibited;

while the message reception notification inhibitor is enabled:
  receiving messages at the mobile device, the messages being directed to the mobile device and at least one such message comprising a voice call; and
  the mobile device examining the received message to determine if the received message includes the exempt message characteristic;
  the mobile device bypassing the message reception notification inhibitor and applying normal processing of the received message only if the exempt message characteristic is identified in the received message; and
  as a default, inhibiting the message reception notification for the received message if the exempt message characteristic is absent and the message is a voice call and sending the voice call to voice mail; and disabling the message reception notification inhibitor, implemented entirely within the mobile device such that normal processing of the received message is applied to all messages.

2. The method of claim 1, wherein at least one such message comprises a text message.

3. The method of claim 1, wherein at least one such message comprises an email.

4. A mobile device for processing received communications in one of a plurality of modes, the mobile device comprising:
  a module operating entirely within the mobile device that enables a first mode of operation that, in response to receiving a communication at the mobile device, operates such that the mobile device provides a user-indicator of such communication reception;
  the module operating entirely within the mobile device enables a second mode of operation that, in response to receiving a communication in the form of a voice call at the mobile device, operates such that the mobile device as a default, inhibits the provision of the user-indicator for the communication and sends the communication to voice mail unless the communication includes at least one user selectable exempt characteristic; and
  a user interface for interacting with the mobile device to selectively enable operation of the mobile device in the first mode and second mode of operation and to select exempt characteristics, wherein the exempt characteristic comprises a telephone number selected from a plurality of telephone numbers stored within the mobile device.

5. A method, operating as a process within a mobile telephone to provide selective inhibition of message reception notifications for communications received by the mobile telephone, the method comprising the steps of:
  in response to activity on a user interface of the mobile telephone that identifies an origination identity of a received message, the process operating, entirely within the mobile telephone, accessing an address book containing entries, the address book being internal to the mobile telephone, to identify the origination identity of at least one of the entries in the address book as an exempt origination identity, wherein the origination identity comprises a telephone number;
  the process within the mobile telephone enabling a message reception notification inhibitor to be active by receiving information identifying an active time and a duration indicator;
  receiving a communication at the mobile telephone, the communication including an origination identity and comprising a voice call; and
  if an inhibiting mode is enabled:
    the process within the mobile telephone examining the communication received at the mobile telephone to determine the origination identity for the received communication;
    the process within the mobile telephone bypassing the message reception notification inhibitor and applying normal processing of the received communication if the origination identity is an exempt telephone number; and
    the process within the mobile telephone inhibiting the message reception notification for the received communication and sending the received communication to voice mail if the origination identity is not an exempt telephone number by suppressing a communication reception indicator of the mobile telephone; and
  if the inhibiting mode is not enabled the process within the mobile telephone applying normal processing of the received communication.

6. The method of claim 5, wherein the communication can further comprise a message that includes at least one of the following message types: electronic messages, text, email, video, and audio and, the step of inhibiting the message reception notification for the communication further comprises inhibiting the message notification for each of these message types if received.

7. A mobile device that includes a notification screening mode, the mobile device comprising:
  a display screen;
  a module operating within the mobile device and causing the mobile device to:
    enter into a notification screening mode;
    receiving identifying information from a user interface that identifies messages that are exempt from the notification screening mode;
    receiving a message at a communications interface to the mobile device;
    examining the content of the message to determine if the message includes the identifying information;
    if the message includes the identifying information, provide an alert indicator that the message was received, whereas the mobile device can alert users of the reception of one or more message types including telephone calls, text messages and emails;

if the message does not include the identifying information, prevent an alert from being provided and dispose of the message;
displaying on the display screen a timer indicating the amount of time that the mobile device will remain in the notification screening mode; and
displaying on the display screen the number of messages that have been received while the notification screening mode has been active; wherein the message comprises a voice call and the identifying information includes an originating telephone number and the mobile device disposes of the voice call by sending it to voice mail.

\* \* \* \* \*